US006005600A

United States Patent [19]
Hill

[11] Patent Number: 6,005,600
[45] Date of Patent: Dec. 21, 1999

[54] HIGH-PERFORMANCE PLAYER FOR DISTRIBUTED, TIME-BASED MEDIA

[75] Inventor: Ralph D. Hill, Los Gatos, Calif.

[73] Assignee: Silcon Graphics, Inc., Mountain View, Calif.

[21] Appl. No.: 08/733,478

[22] Filed: Oct. 18, 1996

[51] Int. Cl.[6] .............................. H04N 7/10; H04N 7/14
[52] U.S. Cl. ................................ 348/7; 348/10; 348/13; 348/12; 455/5.1; 455/4.2
[58] Field of Search .................................. 348/7, 10, 13, 348/12, 6; 455/5.1, 4.2, 3.1, 6.2; 370/428, 522; H04N 7/10, 7/14

[56] References Cited

U.S. PATENT DOCUMENTS

| | | | |
|---|---|---|---|
| 5,357,276 | 10/1994 | Banker et al. | 348/7 |
| 5,442,389 | 8/1995 | Blahut et al. | 348/7 |
| 5,477,263 | 12/1995 | O'Callaghan et al. | 348/7 |
| 5,517,257 | 5/1996 | Dunn et al. | 346/7 |
| 5,528,282 | 6/1996 | Voeten et al. | 348/7 |

(List continued on next page.)

OTHER PUBLICATIONS

"24 Digital TV Channels in the Space of a Single Analog Channel," Imedia: StatMux, published on the Internet at http://www.imedia.com/statmux.html, pp. 1–8, date unknown.

Cowan et al., "Adaptive Methods for Distributed Video Presentation," *ACM Computing Surveys,* vol 27, No. 4, Dec. 1995, pp. 580–583.

"Full VCR–Like Functionality in a Broadcast Environment," Imedia StatMux: Product Notes, published on the Internet at http://www.imedia.com/virtualver.html, pp. 1–2, date unknown.

"Immedia Sets MPEG–2 Record at NAB '96: Demonstrates 24 Digital TV Channels in Single Analog Channel Bandwidth," Imedia: Press Release\NAB '96, published on the Internet at http://www.imedia.com/p–nabdemo.html, pp. 1–3, date unknown.

"Increased Channel Utilization for Pre–Compressed Video, NVOD and PPV," Imedia StatMux: Produt Notes, published on the Internet at http://www.imedia.com/precompressed.html, pp. 1–2, date unknown.

"Increased Channel Utilization," Imedia StatMux: Product Notes, published on the Internet at http://www.imedia.com/realtime.html, pp. 1–2, date unknown.

McCanne et al., "vic: A Flexible Framework for Packet Video," Proceedings, ACM Multimedia '95, San Francisco, California, Nov. 5–9, 1995, pp. 511–522.

"StarCast Product Overview," published on the Internet at http://www.starlight.com/starlight/html/prodfldr/starcast.html, pp. 1–3, date unknown.

"StarWare: The High Performance Multi–Media Software," published on the Internet at http://www.starlight.com/starlight/html/prodfldr/StarWare20.html, pp. 1–4, date unknown.

"StarWorks Family Overview," published on the Internet at http://www.starlight.com/starlight/html/prodfldr/starworks3.0.html, pp. 1–3, date unknown.

"Training on Demand," published on the Internet at http://www.starlight.com/starlight/html/prodfldr/ds.tod.frame.html, pp. 1–2, date unknown.

*Primary Examiner*—Nathan Flynn
*Assistant Examiner*—Vivek Srivastavia
*Attorney, Agent, or Firm*—Sterne, Kessler, Goldstein & Fox P.L.L.C.

[57] ABSTRACT

The present invention is directed to a system and method for enabling a user to view a moving picture with synchronized audio using a workstation connected to a digital network. The user may change both speed and direction, as well as jump between arbitrary points in the movie being played. According to the present invention, digitized movie data may be accessed from different sources (e.g., network servers, local disks). These sources vary in speed and response time as a result of their capabilities (e.g., limited I/O bandwidth) and transient events (e.g., resource contention). The present invention adapts to these varying conditions in order to maintain a stable output.

18 Claims, 7 Drawing Sheets

U.S. PATENT DOCUMENTS

| | | | |
|---|---|---|---|
| 5,544,327 | 8/1996 | Dan et al. | 348/7 |
| 5,606,359 | 2/1997 | Youden et al. | 348/7 |
| 5,629,732 | 5/1997 | Moskowitz et al. | 348/7 |
| 5,720,037 | 2/1998 | Biliris et al. | 348/7 |
| 5,721,815 | 2/1998 | Ottesen et al. | 348/7 |
| 5,761,303 | 6/1998 | Hobbs et al. | 380/19 |

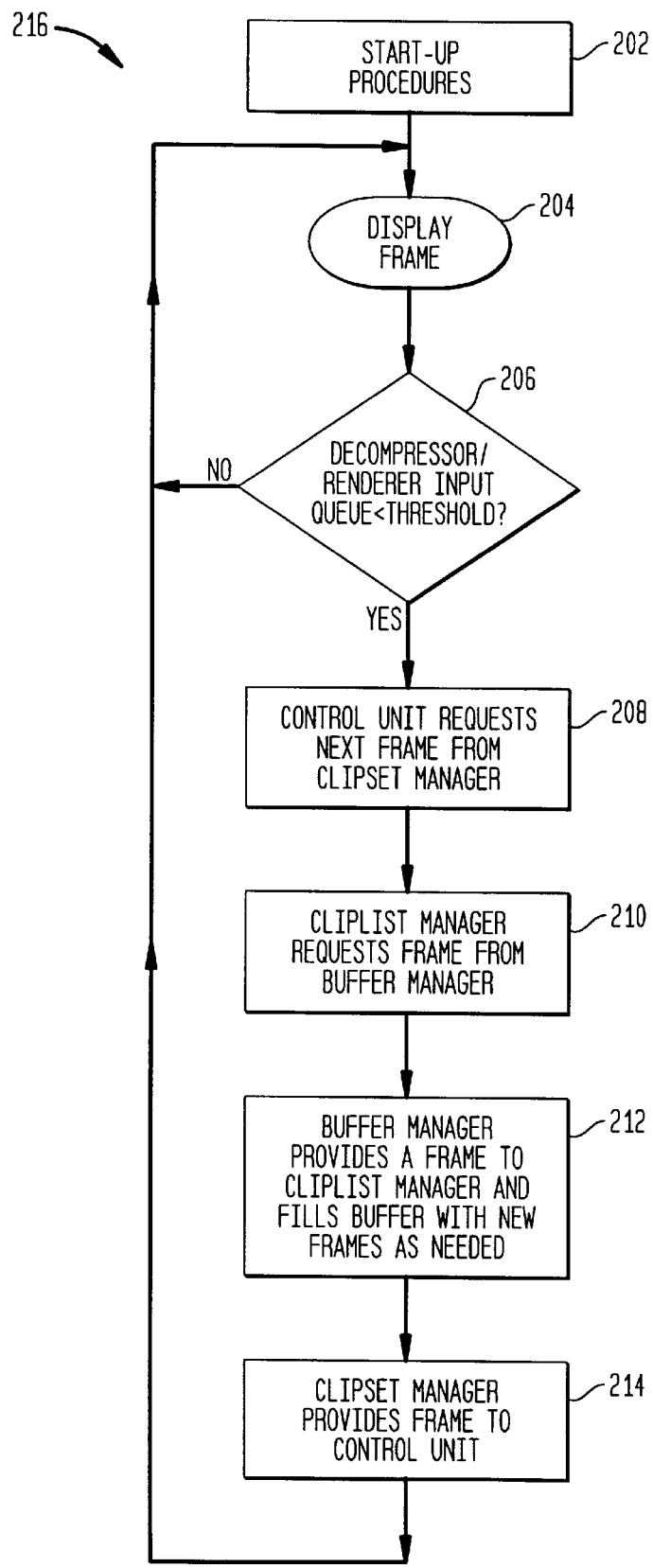

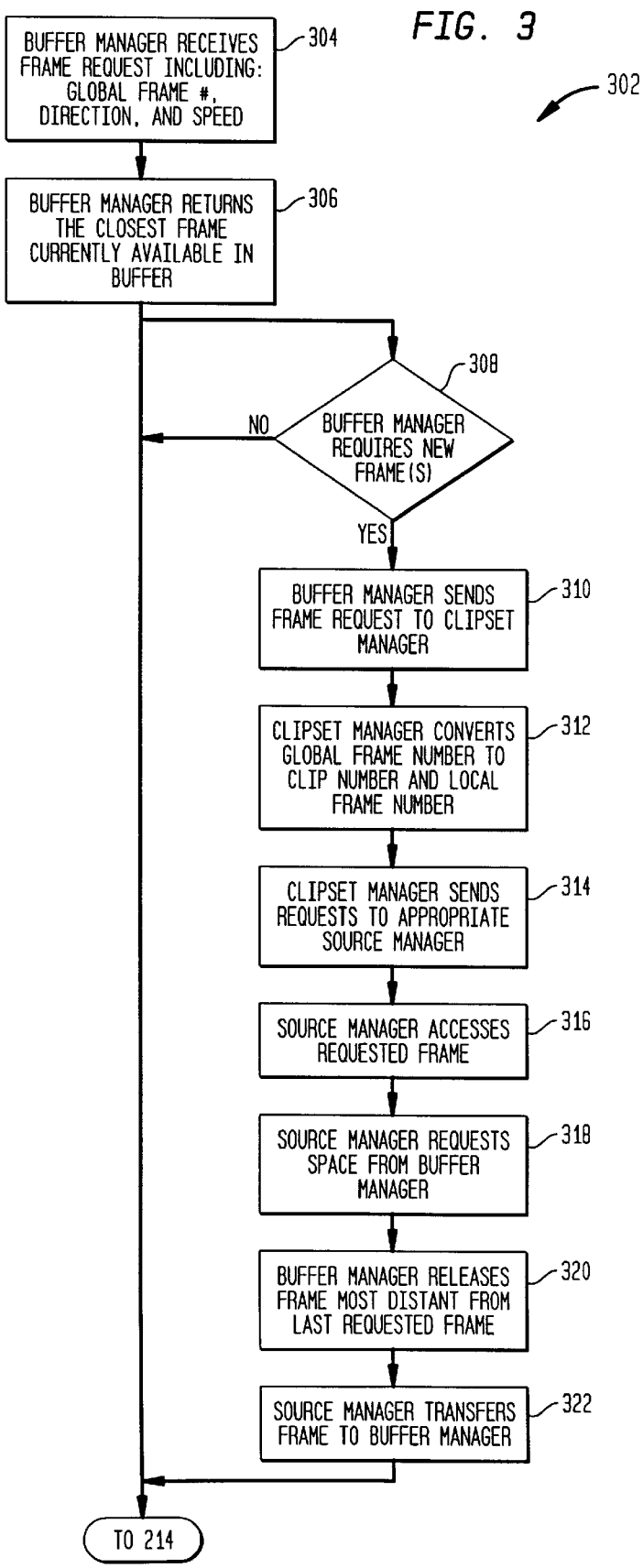

HIGH-PERFORMANCE PLAYER FOR DISTRIBUTED, TIME-BASED MEDIA

BACKGROUND OF THE INVENTION

1. Field of the Invention

The present invention relates generally to audio/video playback devices, and more particularly to playing movie data held in various storage devices with varying bandwidth capabilities, where the movie player adapts to these varying conditions.

2. Related Art

Today, a wide variety of applications demand that a workstation display a moving image with accompanying sound. Often these workstations must access the audio and video data from multiple sources, some local and some accessed via a network connection. This data must be supplied to the display unit at a constant rate in order to achieve a steady picture. Problems arise when the data is not provided to the workstation at the required rate.

This problem is particularly acute when the data source must be accessed via a network. Delays in accessing data over standard networks tend to be longer and have a wider variance than accessing data from a local source (e.g., local RAM, local disk drive). Conventionally, one must insure that the network provides the data at a constant rate in order to achieve an acceptable output.

This solution, known as a "server push" solution, requires a powerful and complex server. The client, however, may be very simple. The client sends a request specifying what to play, and how fast to play it. The server responds by sending the requested information at the requested rate. Again, the rate at which the information flows from the server to the client must be very close to constant as the client has limited memory to buffer the information.

This approach presents several problems. Any interruption in the flow of data will cause an immediate degradation in output quality. Thus, there is no allowance for network contention or errors. Further, there is no feedback from the client to the server to advise the server of problems with the transmission. The client only sends messages to the server when the user issues a playback command, such as "stop," or "fast forward."

The primary advantage associated with the server push solution is the minimal cost of client hardware and software. However, this advantage is more than offset by the cost of a sophisticated server which must provide a guaranteed bandwidth and actively monitor the status of the client. This complexity has a deleterious effect on server reliability: increased sophistication results in decreased reliability.

A need exists for a system which offers high-performance, user-controlled playback over a general purpose computer network. Users often want to integrate this capability into an existing network which performs numerous other tasks as well. However, existing networks often are unreliable and unsophisticated, precluding the use of a server-push solution. Another solution which accommodates the use of an existing network would have obvious cost advantages over the server-push which requires a new, sophisticated network dedicated almost exclusively to audio/video playback.

Also, users have often invested heavily in relatively sophisticated client hardware, such as conventional personal computers or high-performance workstations. Again, this does not fit the server-push solution.

Numerous applications exist for the appropriate solution. Multi-media software, commonly used today in a variety of environments, integrates moving pictures and sound. Dedicated machines are also being developed for playing games over a network. These games also involve sophisticated graphics and sound.

Finally, modern animation is often developed in a shared network environment where multiple animators access a common database. It is often the case where data needs to be accessed from different sources. Ideally, the scene currently being edited by the animator will be stored locally for easy access. In order to develop the scene in context, it is very useful to be able to play the scenes immediately before and after. These surrounding scenes, called "hook-ups", often are stored as part of a large library accessed via the network.

These hook-ups may be copied to the local machine before being played. However, this takes time and does not insure that the animator has been provided with the latest copy as editing of all scenes may be ongoing.

Thus, what is requires is an improved system and method for utilizing existing computer networks and client hardware to provide user-controlled, high performance audio/video playback.

SUMMARY OF THE INVENTION

Briefly stated, the present invention is directed to a system and method for user-controlled playback of synchronized audio and video information where the data is accessed via sources of varying bandwidth capabilities.

The system provides a buffer management system whereby the strategy for accessing data adapts as source capabilities change. The system attempts to prefetch data that is likely to be required in the near future. This buffering allows the system to provide constant picture quality in case the flow of data slows.

The present invention monitors the fill level of the buffer and if it has difficulty maintaining an acceptable level of data, the system begins to selectively make fewer requests. This allows the buffer to catch-up while easing the burden placed on the sources to provide data. As the buffer fills, the request strategy returns to normal.

The present invention also retains a certain amount of data just displayed. Having this data on hand allows the system to respond immediately to user requests for a change in direction of play.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein:

FIG. 2 is a flowchart representing the general operation of the preferred embodiment;

FIG. 3 is a flowchart representing the preferred input/output operation of the buffer manager;

DETAILED DESCRIPTION OF THE PREFERRED EMBODIMENTS

Overview of the Invention

The present invention is directed to a system and method for enabling a user to view a moving picture with synchronized audio using a workstation connected to a digital network. The user may change both speed and direction, as well as jump between arbitrary points in the movie being played. According to the present invention, digitized movie data may be accessed from different sources (e.g., network servers, local disks). These sources vary in speed and response time as a result of their capabilities (e.g., limited I/O bandwidth) and transient events (e.g., resource contention). The present invention adapts to these varying conditions in order to maintain a stable output.

Figure 1:
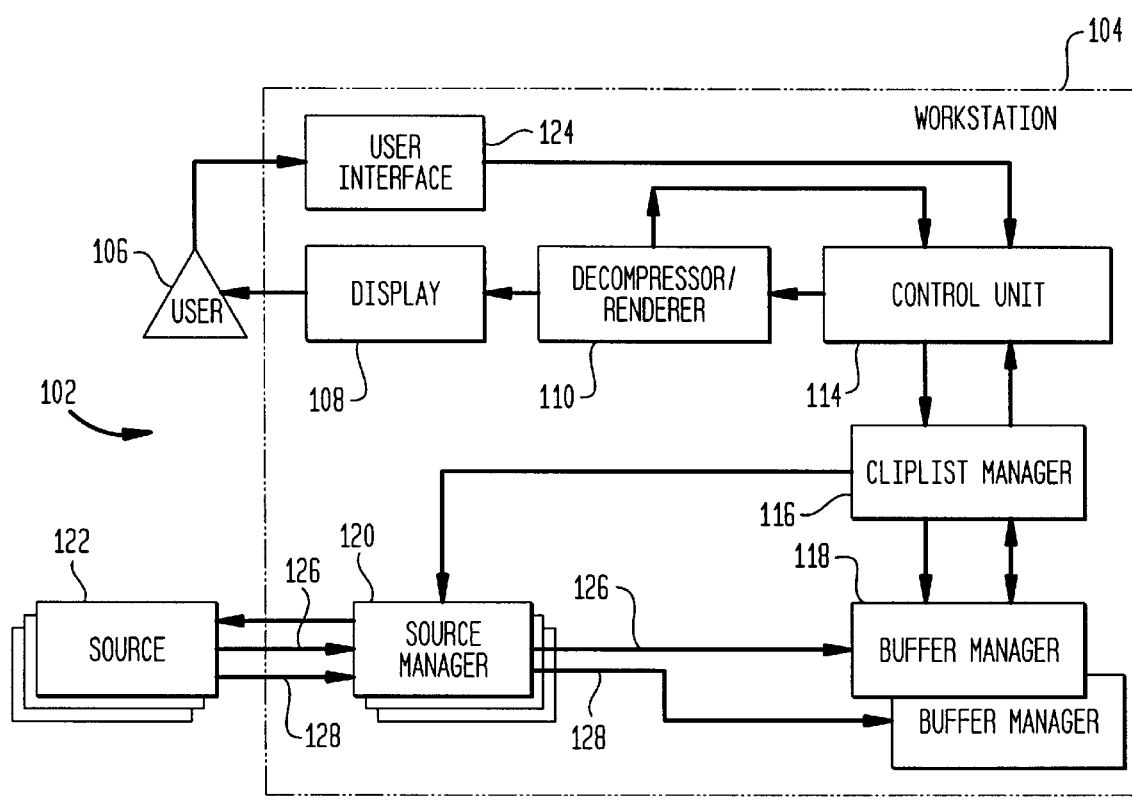
FIG. 1 is a block diagram of a digital network environment according to a preferred embodiment of the present invention.

FIG. 1 is a block diagram of a digital network environment 102 within which the invention is used. A user 106 utilizes the workstation 104 to play movie data. The workstation 104 may be a conventional personal computer, a high performance workstation, or dedicated hardware specially suited for audio/video playback. The user 106 views the movie data on display 108 while issuing control information (e.g., "go forward," "go backward," "play faster") via a standard user interface 124 (e.g., keyboard, mouse, joystick).

Movie data is composed of synchronized audio and video information. This information is broken into fundamental units called frames. For each video frame there is an associated audio frame. A video frame contains the video information to display a single image. An audio frame contains the audio information associated with that image. For ease of notation, the term 'frame' will be used throughout to refer to either audio or video frames, as they are generally treated the same.

A clip is a sequence of frames. The movie data of interest to a user will be composed of one or more clips.

Clips may be stored in different locations within the digital network environment 102. For purposes of discussion, assume that the movie data of interest to the user contains $N_c$ clips, each stored in a separate source 122. The clips may or may not be stored according to a conventional compression format. Each source 122 may be any type of digital memory, and may be accessed either locally or via a network server. Note that a source may be a site on the Internet.

The workstation 104 contains a control unit 114 responsible for the overall control of the system. The control unit 114 receives control information from the user 106 via the user interface 124. Examples of control information include commands to stop, reverse play, speed-up play, slow-down play, or skip to an arbitrary frame. The control unit 114 also receives control information from the decompressor/renderer 110. This control path will be discussed below.

The display 108 provides a video image for the user 106, while a conventional speaker (not shown) provides the audio. The decompressor/renderer 110 is responsible for decompressing the video and audio and presenting them to the display 108 in correct synchronization. The control unit 114 is responsible for feeding frames to the decompressor/renderer 110 in the proper sequence. Note that decompression is only required if the movie data is stored in a compressed format (e.g., JPEG for video information).

The buffer manager 118 provides frames upon request to the control unit 114 via the cliplist manager 116. In order to provide frames quickly, the buffer manager 118 stores a limited number of frames in local digital memory, such as random access memory (RAM) or a local disk drive. The goal is to always have available the next frame required by the control unit 114 when that frame is requested. The buffer manager 118 accomplishes this goal by fetching frames likely to be required before they are requested. This will be referred to as prefetching future frames.

The buffer manager 118 also retains a certain number of the frames most recently sent to the control unit 114. This allows the buffer manager 118 to respond immediately if the direction of play is reversed. These frames will be referred to as history frames.

The buffer manager 118 transfers frames to the control unit 114 via the cliplist manager 116. It is the responsibility of the cliplist manager 116 to keep track of where within the digital network environment 102 each clip is stored. Thus, in order to replenish it's store of frames, the buffer manager 118 must request them via the cliplist manager 116.

The cliplist manager 116 requests frames from a particular source 122 via the appropriate source manager 120. The source manager 120 provides the necessary interface (i.e., hardware or software) for communicating with a source 122. The digital network environment 102 includes an arbitrary number of sources ($N_c$) from which frames may be accessed. The workstation 104 provides one source manager 120 for each source 122.

Movie data flows between the source 122, the source manager 120, and the buffer manager 118 along discrete paths, or tracks, with one track for each type of information. Two tracks will be described with respect to the preferred embodiment: audio and video. However, these are discussed by way of example only. Other types of data might also be useful. For example, in the context of professional video editing, user commentary would be a useful supplement to append to particular portions of the movie data.

Audio data flows along the audio track 126, as shown in FIG. 1. Similarly, video data flows along the video track 128. Note that a separate buffer manager 118 is provided for each track. The buffer managers generally operate independently of each other, with two exceptions. First, they must provide audio and video frames to the control unit 114 synchronously so that image and audio are correctly aligned. Second, the concept of priority tracks, discussed in detail below, forces them to operate in a somewhat interdependent manner. However, unless otherwise specifically noted, the buffer managers all operate in an identical fashion, and all will be referred to as buffer manager 118.

General Operation

FIG. 2 is a flowchart 216 representing the general operation of the present invention. The following discussion will also make references to the system depicted in FIG. 1. In step 202, the control unit 114 initiates start-up procedures when the user first requests playback of movie data. These procedures basically involve filing the buffer manager 118 with the appropriate frames, passing the first frame to the control unit 114, and issuing other preparatory commands. A detailed description is provided below.

In step 204, the control unit 114 causes the first frame to be displayed to the user by passing the data to the decompressor/renderer 110. The operation of the decompressor/renderer 110 is well known in the art, and as such will not be discussed in detail herein.

In step 206, the control unit 114 monitors the input queues of the decompressor/renderer 110. When the queue fill level drops below a certain threshold, the control unit 114 requests the next frame from the cliplist manager 116, as shown in step 208.

In step 210, the cliplist manager 116 requests this frame from the buffer manager 118. The buffer manager 118 provides a frame to the cliplist manager 116, as shown in step 212. The buffer manager 118 then refills its buffers with new frames as they are needed. This refill operation is critical to the present invention, and is described in detail below with respect to FIG. 3 and FIG. 4.

In step 214, the cliplist manager 116 gives the frame to the control unit 114, which, in turn, gives it to the decompressor/renderer 110. The operation continues by displaying the next frame, step 204. Frames are displayed without interruption until the input queue in the decompressor/renderer 110 again falls below a threshold.

Buffer 1/0

FIG. 3 is a flowchart 302 providing the detailed operation of step 212 as shown in FIG. 2. In general, buffer manager 118 responds to requests for frames from cliplist manager 116 then determines whether new frames need to be loaded. If new frames are required, it uses the cliplist manager 116 to retrieve these frames from the appropriate source 122. The source 122 accesses the requested frame then requests space from the buffer manager 118 before transferring it.

In step 304, the buffer manager 118 receives a frame request from cliplist manager 116. The request includes a global frame number (described below), the direction of play (i.e., forward or reverse), and the speed of play.

In step 306, the buffer manager 118 returns the closest frame currently available in the buffer. Normally the exact frame is available. However, under certain circumstances this will not be the case (e.g., the buffer manager 118 was unable to retrieve a particular frame in time due to resource contention). Displaying the closest frame rather than the exact frame will cause some degradation in performance. This degradation, though, is preferable to suspending operation and displaying a blank screen.

At this point, the flowchart 302 indicates two paths. One path shows control passing back to step 214, the other to step 308. According to the preferred embodiment, these two paths are performed concurrently.

In step 308, the buffer manager 118 determines whether additional future frames must be prefetched in order to have them on hand when they are later requested by the control unit 114. This determination is described in detail below with respect to FIG. 4. In a preferred embodiment, the buffer manager 118 either makes no request, requests one frame, or requests two frames. If the buffer manager 118 requests no frames, normal operation continues through step 214 without any further action by the buffer manager until the control unit 114 makes another request.

Figure 7:
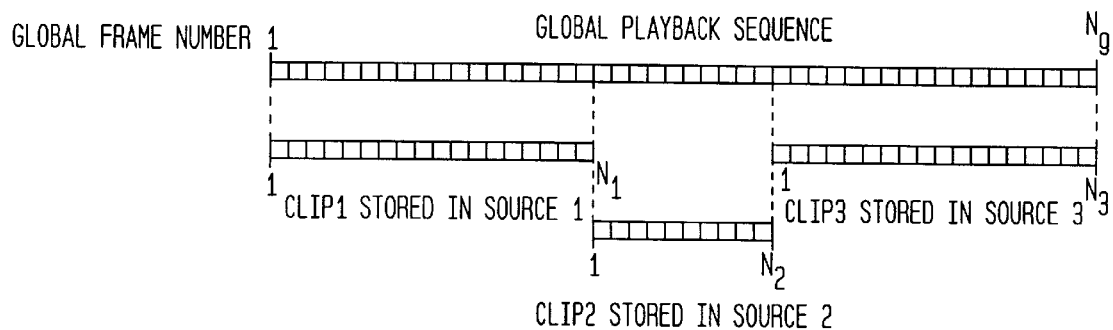
FIG. 7 represents the organization and representation of movie data within the preferred embodiment.

If the buffer manager 118 requests either one or two new frames, operation continues to step 310. Note that frames may be referenced in one of two different ways. The control unit 114 and the buffer manager 118 reference frames according to a global frame number, as shown in FIG. 7. Here, three clips are shown ($N_c=3$), each of a different length ($N_1$, $N_2$, $N_3$) and stored in a different source. The three clips together form the global playback sequence.

Frames may either be referenced according to their position within the global playback sequence (i.e., global frame number), or according to their position within the clip from which they originate (i.e., local frame number). The control unit 114 and the buffer manager 118 reference frames according to the former. Thus, requests from the control unit 114 may be answered by the buffer manager 118 without having to translate the frame number.

In step 310, the buffer manager 118 sends requests for new frames to the cliplist manager 116. The cliplist manager 116 maintains the mapping between global and local frame numbers. Thus, in step 312, the cliplist manager 116 converts the global frame number to a clip number and local frame number.

In step 314, the cliplist manager 116 requests the frames from the appropriate source manager 120. The source manager 120 in step 316 retrieves the requested frame data from the source 122.

In step 318, the source manager 120 requests space in memory for the new frame(s) from the buffer manager 118. The buffer manager 118 must then release a frame it is currently storing to provide space for the incoming frame, as shown in step 320.

Many possible strategies might be used to determine which frame is released. According to a preferred embodiment, the buffer manager 118 releases the frame that is most distant from the frame that the buffer manager 118 has most recently requested. In general, the goal is to retain frames that are likely to be used soon and to release those unlikely to be needed. This simple approach works well in practice and is easily implemented.

In step 322, the source manager 120 transfers the requested frame to the buffer manager 322. Operation continues in step 214 with no further action by the buffer manager 118 until the control unit 114 requests another frame.

Buffer Management

FIG. 4 is a flowchart 402 representing the buffer management strategy of the present invention, and is a detailed representation of step 308 as shown in FIG. 3. The following discussion will also involve FIG. 5 and FIG. 6, which depict the buffer management strategy under a variety of operating conditions.

Figure 4A:
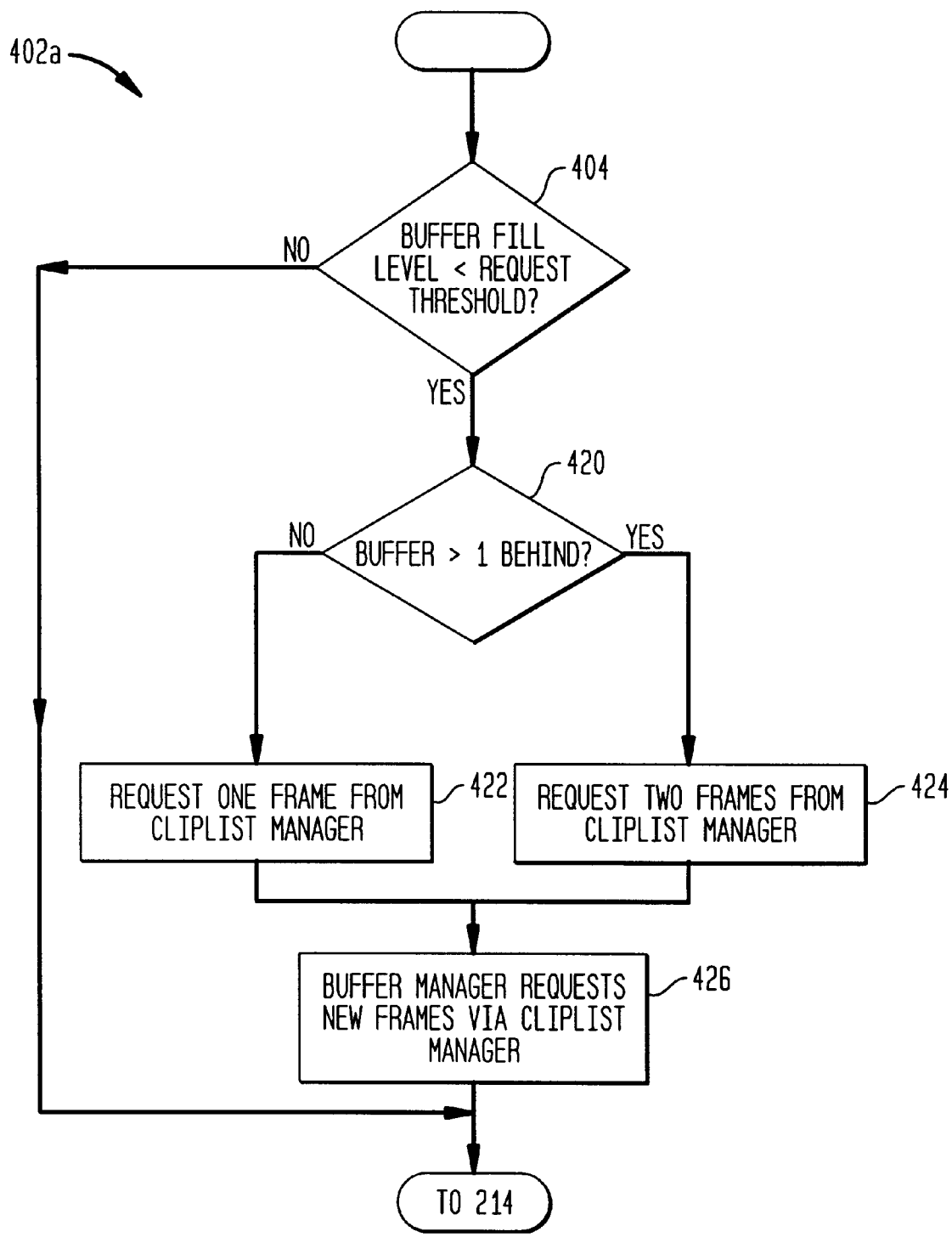
FIG. 4A is a flowchart representing the basic operation of the preferred buffer management strategy.
Figure 4B:
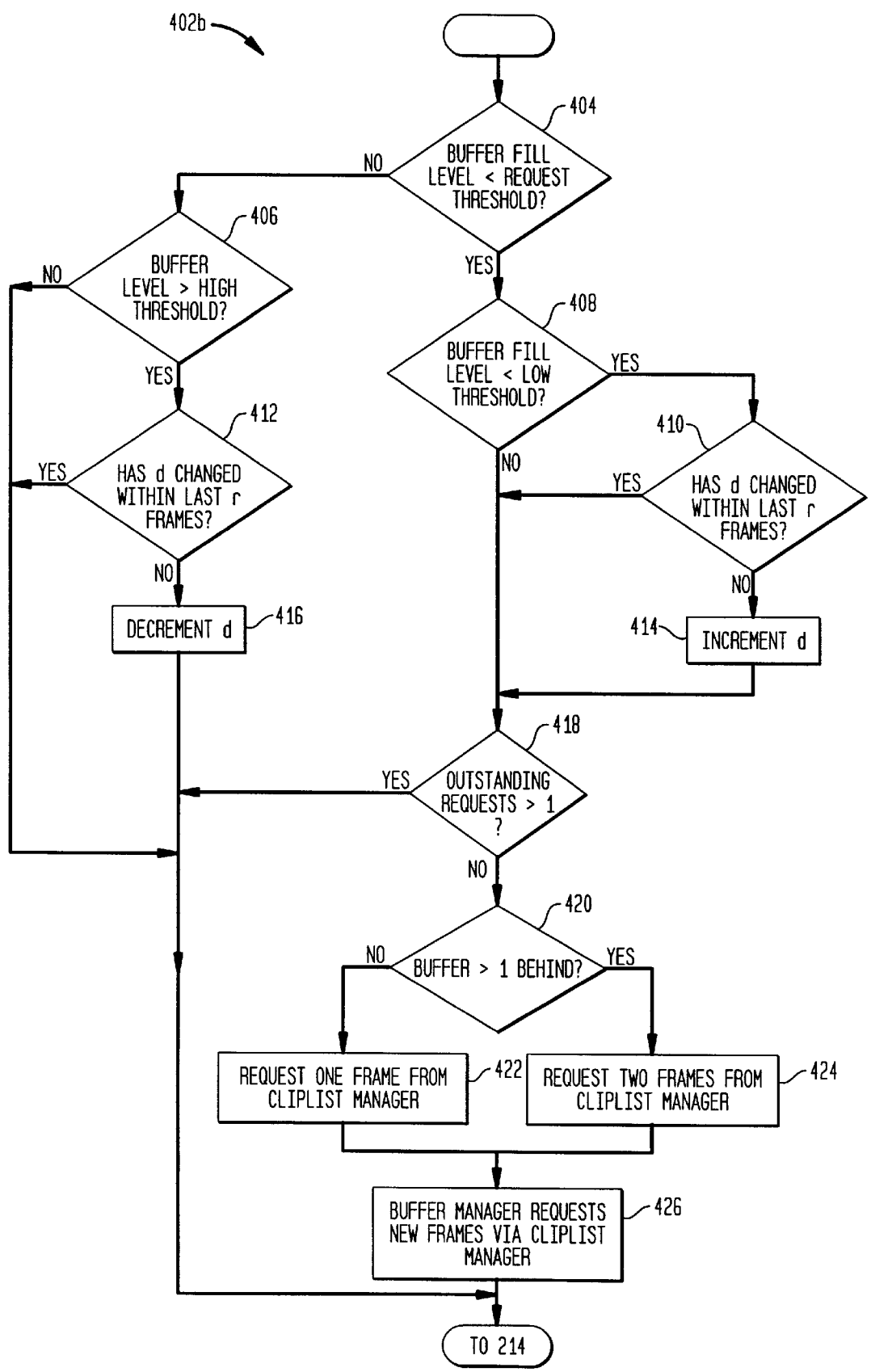
FIG. 4B is a flowchart representing the operation of the preferred buffer management strategy including additional structures to account for abnormal operating conditions.
Figure 5A:
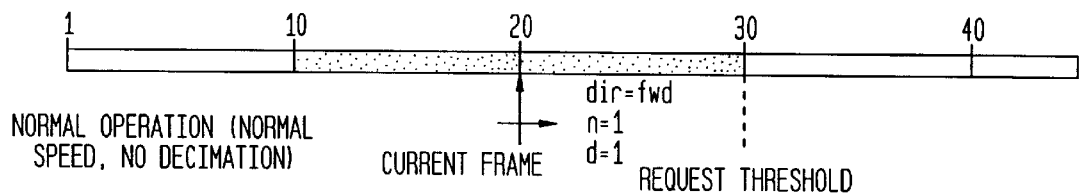
FIG. 5 represents the buffer management strategy given a variety of operating conditions.
Figure 5B:
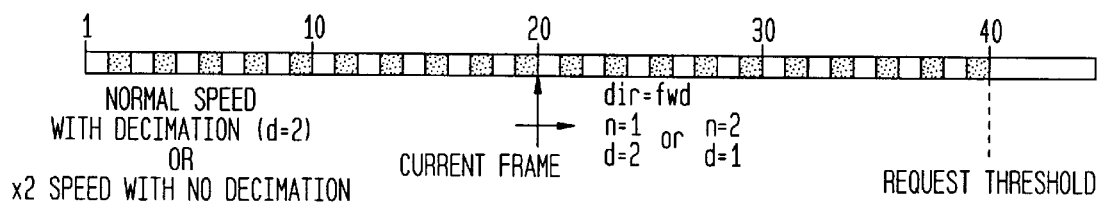
Figure 5C:
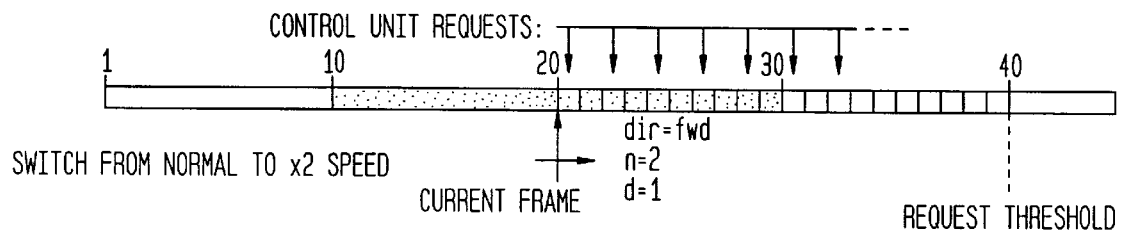
Figure 5D:
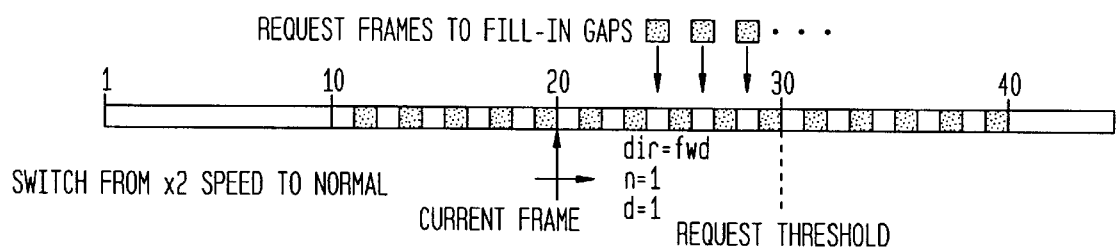

The buffer management strategy is first described under normal operating conditions, as depicted in FIG. 4A The strategy is then described under a variety of abnormal conditions: high speed play, starting play, stopping play, reduced source bandwidth, increasing play speed, decreasing play speed, changing direction, and jumps in location. FIG. 4B includes additional operational details relating to how these conditions are handled.

Normal Operation

First consider the case where the user is playing the movie at a normal play speed in the forward direction (i.e., normal operation). The goal of the buffer manager 118 is to retain some frames that have recently been shown to the user (i.e., history frames), and to get frames that will soon be shown to the user if the current speed and direction are maintained (i.e., future frames).

Referring to FIG. 4A, the buffer manager 118 determines whether the buffer fill level has dropped below the request threshold, as shown in step 404. The buffer fill level refers to the number of future frames currently being stored in the buffer manager 118, not frames that have been requested but not yet received. The request threshold represents the optimum number of future frames stored in the buffer at any given time, and should be determined based on the characteristics of a particular system (e.g., I/O bandwidth, source latency).

The buffer manager 118 retains a number of history frames equal to the request threshold as well; the reasons for this will become apparent when reverse-play is discussed.

The buffer manager 118 will not request additional frames when the fill level exceeds the request threshold. Additional frames might be requested if the fill level drops below the threshold depending upon other factors. For the purposes of discussing normal operation, assume that these factors do not come into play and at least one additional frame will be requested when the fill level does not exceed the request threshold.

In step 420, the buffer manager 118 determines by how many frames the request threshold exceeds the fill level. The buffer manager 118 will request one new frame from the cliplist manager 116 if the request threshold exceeds the fill level by one frame (i.e., one frame behind). If the buffer manager 118 is more than one frame behind, it will request two new frames. However, in a preferred embodiment no more than two new frames will be requested for each request received from the cliplist manager 116 in order to avoid overloading the sources. Hence, if the play rate is 24 frames per second, the sources will not be asked to supply more than 48 frames per second. However, the present invention is not limited to requesting only two frames at a time, as would be apparent to one skilled in the art.

In step 422, the buffer manager 118 requests one new frame. Under normal operating conditions, the global frame number of the new frame is calculated by adding one to the last request made by the buffer manager 118. In step 424, the buffer manager requests the next two frames following the last request. The buffer manager 118 requests these frames via the cliplist manager 116 in step 426. Operation continues with step 214.

FIG. 5(*a*) provides an example of the normal operation of the buffer manager 118 (i.e., forward play at normal speed). In this example, the control unit 114 has recently asked for frame 20. As was mentioned previously, the control unit 114 provides the direction and the speed of play in addition to a global frame number with every frame request.

When the control unit 114 requests global frame 20 (via the cliplist manager 116), the buffer manager 118 replies by providing global frame 20 to control unit 114 via cliplist manager 116 and checks the fill level against the request threshold (for this example, request threshold=10). The buffer manager 118 does this by checking to see if it has frames 21 through 31. Normally, the most distant frame has not been requested. Assuming this is the case, the buffer manager 118 will then request global frame 31. This request is sent to the cliplist manager, which maps the global frame number to a clip number and local frame number and forwards the request to the appropriate source.

As mentioned above, the source manager 120 contacts the buffer manager 118 to reserve space for the new frame once it has been retrieved. In the preferred embodiment, the buffer manager 118 releases the frame that is most distant from the frame that the buffer manager has most recently requested. Here, global frame number 10 is released.

The following sections will discuss buffer management strategy under abnormal conditions (i.e., conditions other than forward play, normal speed).

High Speed Play

The sources 122 and the decompressor/renderer 110 often have difficulty displaying every frame at speeds faster than normal playback. The current invention solves this problem by showing every nth frame, where n is the absolute value of the rate of play, rounded up. So, to play at two times normal speed, every second frame is shown at the same rate (frames/second) as before. FIG. 5(*b*) depicts this situation.

In steps 422 and 424 of FIG. 4A, the buffer manager now adds n to the last frame requested when determining which frames to request. Note that the control unit 114 and the buffer manager 118 may get out of phase. The control unit may request frames 34, 36, 38, 40, . . . , while the buffer manager may be requesting 35, 37, 39, 41, . . . . In this case, the buffer manager 118 returns the closest frame it has. This will result in no loss of quality for the user, nor will it impair the user's ability to perform any task otherwise available.

Now when computing the buffer fill level, every nth frame is counted rather than every frame. The buffer manager 118 must look further into the future to meet the request threshold. As shown in FIG. 5(*b*), the request threshold moves twice as far into the future at double speed. This alteration does not require that the buffer manager 118 operate faster or store more information; it only requires that the frames be fetched in a different order.

Note that the strategy for releasing frames from the buffer manager 118 that was discussed above continues to work with this modified strategy for requesting frames.

Inadequate Source Bandwidth

The preceding discussion assumed that the sources 122 will always be able to provide frames at the normal play rate. The buffer management strategy described thus far will operate properly with some jitter in source performance, so long as the sources 122 perform at the desired rate averaged over several frames (less than half the number of frames stored by the buffer manager 118). However, not all sources will be able to meet this requirement. Some problems may be transitory (e.g., temporary resource contention), others will be continuous (e.g., low-speed networks).

The current invention solves this problem by modifying the buffer management strategy in several ways. These modifications are reflected in flowchart 402*b* of FIG. 4B.

First, the buffer manager 118 monitors the number of requests for frames that are outstanding with the sources 122. Having a large number of outstanding requests will not likely increase performance. It will, however, increase latency when the user changes direction or jumps to another clip. This is because all of the old, outstanding requests must be processed before any new requests. Thus, keeping the queue of outstanding requests short reduces latency.

Thus, the buffer manager 118 limits itself to two outstanding requests, as shown in step 418 of FIG. 4B. This works well for configurations that have been tested. With high-latency, high-bandwidth networks, the number may have to be increased. Decreasing the number might make sense for networks with very low latency and very low bandwidth.

In step 418 of FIG. 4B, the buffer manager 118 determines the number of outstanding requests before it requests new frames. No new requests are made if the number of outstanding requests is greater than two. Note that under these circumstances the buffer manager 118 will tend to fall behind, since it only requests new frames when the control unit 114 requests frames.

The current invention solves this problem by monitoring the buffer fill level and decimating requests from the buffer manager 118 when the fill level drops below a low threshold.

In step 408, the buffer manager 118 determines whether the buffer fill level has dropped below the low threshold. A decimation factor d is maintained for each track. Each track begins with a decimation value of one (i.e., no decimation). The buffer manager 118 increments by one the decimation factor for a given track when the buffer fill level associated with that track drops below the low threshold, as shown in step 414.

In the absence of decimation, the buffer manager 118 determines which frame to request by adding n (i.e., the speed of play) to the global frame number of the last frame requested. With decimation, the buffer manager 118 determines the next request by adding n×d to the last global frame number requested, where d is the track's decimation factor. FIG. 5(*b*) illustrates an example of this operation.

Note that this operation is functionally equivalent to high speed play (n=2) with no decimation, with one difference. Even though the buffer manager 118 begins decimating it's requests in order to catch up, the control unit 114 continues to request each frame. As described in step 306 (FIG. 3), the buffer manager 118 returns the closest available frame. Thus, the control unit 114 displays each frame d times during periods of decimation while the buffer manager 118 catches up. By comparison, this does not occur during high speed play. Here, every nth frame is displayed once, resulting in video and sound that appears nx faster because the same number of frames are being displayed per second.

In step 406, the buffer manager 118 determines whether the buffer fill level exceeds a high threshold. This situation might occur after a period of decimation and result in some oscillation. The buffer manager 118 decrements the decimation factor d for a given track when this occurs, as shown in step 416. Thus, in the case of transitory problems, the decimation factor will be reduced when the problem is solved.

This basic approach to decimation does not work well. It tends to oscillate badly. To dampen the oscillations, the decimation factor is changed at most once every r requests for frames from the control unit, as illustrated by steps 410 and 412. The value of r is a tunable parameter. Increasing r reduces the oscillations but can result in the decimation factor not increasing fast enough in response to sudden network problems. Careful tuning of r and the number of future frames stored by the buffer manager 118 can minimize the problem.

Figure 6A:
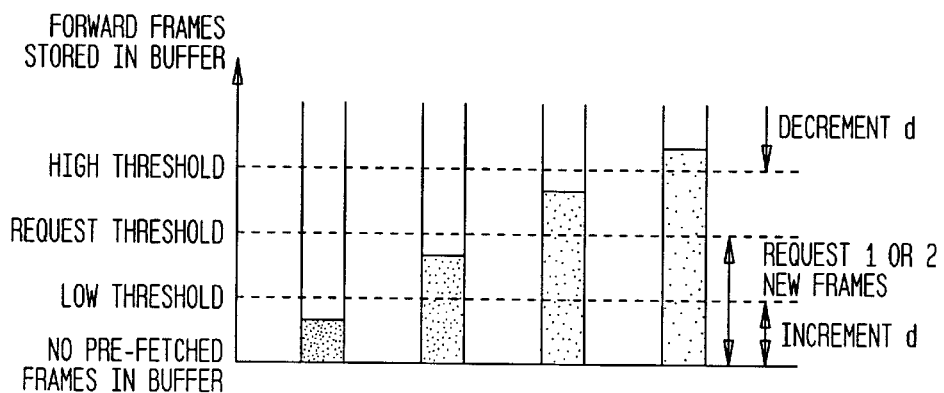
FIG. 6 summarizes the various thresholds applied to the buffer fill level according to the preferred buffer management strategy.
Figure 6B:
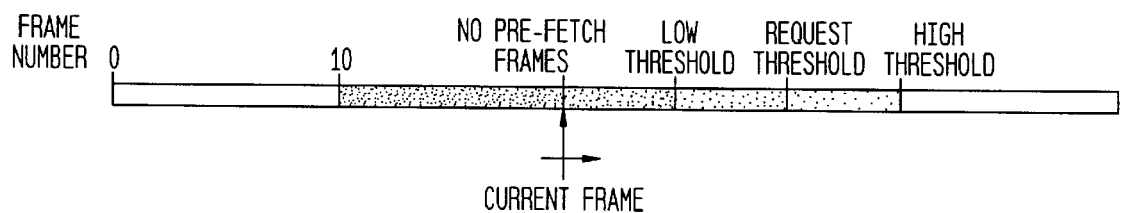

FIG. 6 graphically summarizes the various thresholds applied to the buffer fill level. FIG. 6(*a*) shows that d is incremented by one when the fill level is less than the low threshold, and decremented by one when the fill level increases above the high threshold. Also, the buffer manager 118 requests two new frames when the fill level is two frames less than the request threshold, one frame when the fill level is one frame less than the request threshold, and no frames requested otherwise.

The buffer management strategy also treats audio and video information differently. In general, a movie consists of an audio track and a video track. The audio information is typically much smaller than the video information. Also, users are far more aware of losing audio information than video information. Thus, the buffer manager 118 decimates the video track more aggressively than the audio track.

The current invention implements this strategy by designating certain tracks as priority tracks. Audio tracks are marked as priority tracks by default. Video tracks are not normally marked as priority tracks.

When the buffer manager 118 associated with a priority track determines that it must increment or decrement the decimation factor, it increments or decrements a global decimation factor g as well. Priority tracks are never actually decimated; the decimation factor associated with a priority track is used to monitor how much that track has contributed to global decimation. Rather than decimating a priority track, all the other tracks are decimated instead in an attempt to reduce resource contention. This should allow the priority tracks to catch up.

Now, in steps 422 and 424 for non-priority tracks, the next frame requested is found by adding n×(d+g) to the number of the last frame requested. Again, priority tracks are never decimated. The next frame is therefore found by adding n to the last frame requested, as before.

Finally, the buffer manager 118 normally uses the global frame number last requested as the starting point for determining which frame to request next. In extreme cases this frame can be further in the past than the most recent frame that the control unit 114 has requested. When this happens, the number of the frame most recently requested by the control unit 114 is used as the starting point instead.

Increasing Play Rate

FIG. 5(*c*) illustrates the situation where the user changes speed from normal (n=1) to twice normal (n=2). The buffer manager 118 had been requesting every frame, according to normal operating conditions. With the speed increase, the control unit 114 now expects the buffer manager 118 to provide every other frame. Thus, the change in speed effectively reduces the buffer fill level by half, as the control unit 114 is no longer interested in every other frame stored in the buffer.

This may cause the buffer manager 118 to decimate until the buffer fill level stabilizes at the new play speed. This decimation may be noticeable to the user, though it may be minimized by tuning the size of the buffer and the high and low thresholds.

Decreasing Play Rate

FIG. 5(*d*) illustrates the situation where the user changes speed from twice normal (n=2) to normal (n=1). Both the buffer manager 118 and the control unit 114 had been requesting every other frame. With the speed decrease, the control unit 114 now expects the buffer manager 118 to provide every frame.

In this situation, the buffer manager 118 must try to fill in the missing frames (i.e., infill). It can concentrate on this as there is no need to fetch frames that are further in the future; the buffer manager 118 already has closely spaced frames twice as far in the future as it needs.

The problem is to decide where to start trying to infill. If the buffer manager 118 begins by requesting the first missing frame, this may not allow the source 122 enough time to retrieve the frame before the control unit 114 requests it. Preferably, the buffer manager 118 will skip a few frames into the future to begin to infill. The exact number to skip should be tuned according to a particular configuration, and depends primarily on system latency.

The buffer manager 118 will continue to provide the closest available frame to the control manager 114 during the brief period before infilling begins. As a result, available frames will be displayed multiple times wherever new frames could not be infilled before being requested by control unit 114. Though the user will experience some momentary degradation in picture and sound quality, this is preferable to halting operation while the buffer manager 118 infills completely.

Changing Direction

As described above, the buffer manager 118 retains the $n_h$ frames most recently sent to the control unit 114 (i.e., history frames), where $n_h$ equals the request threshold. Thus, the buffer manager 118 retains as many history frames as the optimum number of future frames. This situation is illustrated by FIG. 5(*a*) and FIG. 6(*b*).

Retaining history frames allows the current invention to change direction of play instantly without any degradation in audio or picture quality. The buffer manager 118 simply begins returning past frames when requested by the control unit 114. The operation proceeds exactly as described above.

Note that some degradation of performance will likely result if the number of outstanding requests for new frames is not limited. As discussed above, the buffer manager 118 preferably limits itself to one outstanding request. Allowing more causes latency problems when the direction of play is reversed. Upon reversing direction, the buffer manager 118 will immediately begin requesting new frames according to the new direction. However, these requests must wait until all the pending requests made while playing in the opposite direction are satisfied first.

This problem might be solved by providing the buffer manager 118 with the capability to abort these outstanding requests. According to the preferred embodiment, the costs in additional system complexity associated with such capability outweigh the benefits associated with reduced latency. Thus, limiting the number of outstanding requests to one is the preferable solution.

Starting

The buffer manager 118 has no frames stored when the user 106 begins using the workstation 104. Play cannot begin until the buffer manager 118 receives the appropriate frames. At start-up, the control unit 114 advises the cliplist manager 116 of the first frame selected by the user 106; this might be the first frame in the global playback sequence or some arbitrary point therein. The cliplist manager 116 passes this information on to the buffer manager 118, which requests a group of frames on either side of this starting frame. This initial request may vary in size; preferably the buffer manager 118 will request as many frames as can be stored.

The delay perceived by the user 106 should be minimal. Assuming that the sources 122 are capable of delivering data at approximately the same rate that frames are display, the delay will equal the amount of play time stored in the buffer. This is an acceptable start-up delay, particularly if other tasks may be accomplished concurrently, such as other initialization procedures.

Stopping

Play may halt for a variety of reasons. The user may stop playback by issuing the appropriate command via the user interface 124, or the control unit 114 may reach the first or last frame in the global playback sequence. As in the starting case, the cliplist manager 116 advises the buffer manager 118 of the situation. The buffer manager 118 preferably takes advantage of this opportunity to ensure that the optimum number of future and history frames are currently being stored. If frames are missing, the buffer manager 118 will immediately make the appropriate requests.

When the user 106 issues a stop command, the decompressor/renderer 110 notifies the control unit 114 of the frame currently being displayed. Due to decompression and rendering latency, this is not likely to be the frame that the control unit 114 has most recently handled. By providing this information from the decompressor/renderer 110 to the control unit 114, the user can be given more rapid response to stop requests.

Jumps in Location

The user interface 124 allows the user 106 to issue commands such as "go to frame 42." It is unlikely that the buffer manager 118 will have frame 42 when this command is issued. Thus, jumps in location are treated like the start up case, where the first frame to be shown is the target frame of the "go to" command.

Supporting Multiple Clips

In typical usage, the current invention accesses a global playback sequence consisting of several clips. The cliplist manager 116 specifies where each clip can be found (e.g., file name on the local disk, server identification number and file name), which frame in the clip is the first to play, and which frame in the clip is the last to play. The compilation of this data is known as the cliplist. A typical cliplist might look like:

server1/sequence1/scene2/latest.movie 50 138
local myscene3.movie 0 123
server1/sequence1/scene4/latest.movie 0 50

This example cliplist has three clips. The first clip is local frames 50 through 138 from the file "/sequence1/scene2/latest.movie". Similarly, the second clip is local frames 0 through 123 in "myscene3.movie", and the third clip is local frames 0 through 50 in "/sequence1/scene4/latest.movie". The second clip is stored locally on the user's workstation. The first and third are located on server1.

The cliplist manager 116 determines the overall length in frames of the global playback sequence (e.g., 138−50+1+124+51=264), and builds a table which maps global frame numbers to clip numbers and local frame numbers. The cliplist manager 116 also creates three source managers 120 of the appropriate types. The source managers 120 may be implemented as hardware or software, as would be well known to someone skilled in the art.

An example operation might proceed as follows. The control unit 114 requests global frame number 95 from the cliplist manager 116, which forwards the request to the buffer manager 118. The buffer manager 118 returns this frame (or the closest available frame) and determines whether any new frames need to be requested.

Assuming normal playback speed and a request threshold of 10, the buffer manager 118 will check to see if global frames 96 through 106 are currently being stored, or whether they have been requested. The most likely case is that all but frame 106 will be requested or already stored. In this case, the cliplist manager 116 maps global frame 106 to clip 2, local frame 17, then requests this frame from the second source manager 120. Note that clip 1 occupies frames 1 through 89 of the global playback sequence, clip 2 occupies 90 through 213. Thus, global frame number 106 corresponds to local frame 17 (106−89) in clip 2.

When that frame is received, the source manager 120 will arrange with the buffer manager 118 to have it inserted into the buffer as global frame 106.

If all of the global frames 96 through 106 have been requested or are stored in the buffer, no new frames will be requested. If more than one frame is needed, at most two will be requested.

While the preferred embodiment of the present invention has been described above, it should be understood that it has been presented by way of example only, and not limitation. Thus, the breadth and scope of the present invention should not be limited by the above-described exemplary embodiment, but should be defined only in accordance with the following claims and their equivalents.

Write Operations

The description of the present invention has thus far centered only on operations whereby movie data is read from memory and displayed. However, the foregoing discussion applies equally well to other embodiments where the movie data may be modified as it is displayed. The user interface 124 might provide editing controls for the user 106 to make alterations in the movie data. These alterations would be recorded by the control unit 114, with the modified frame being sent back to the buffer manager 118 to replace the old frame. These, and other like embodiments would be readily apparent to someone skilled in the relevant art.

What is claimed is:

1. A system for playing digital movie data under the control of a user, wherein the movie data comprises a sequence of frames, said system comprising:

display means for displaying the movie data to said user;

control means, coupled to said display means, for providing the movie data to said display means under control of said user;

user interface means, coupled to said control means, for interacting with said user to provide said control of said user;

at least one source means that stores a portion of the movie data; and buffer management means, coupled to said control means and to said source means, for storing a subset of the movie data and providing the movie data as needed to said control means, said buffer management means comprising:

local digital memory that stores a plurality of frames including future frames and history frames, prefetch means for requesting future frames from said source means, wherein said prefetch means requests every dth future frame when said source means cannot provide future frames at the rate at which they are requested, and wherein d is greater than one; and means for releasing a select frame from said local digital memory when a frame requested by said prefetch means becomes available.

2. The system of claim 1, wherein said select frame is the frame in said subset most distant from the frame last requested by said prefetch means.

3. The system of claim 1, wherein said user interface means comprises:

speed control means for causing said control means to provide every nth one of said frames to said display means; and direction control means for controlling the order in which said frames are provided to said display means.

4. The system of claim 1, further comprising:

cliplist management means, coupled to said control means and further coupled between said buffer management means and said source means, for tracking where said frames are stored within said source means and for routing requests from said prefetch means to said source means.

5. The system of claim 1, wherein at least one of said source means comprises a digital memory accessed via a digital network.

6. The system of claim 5, wherein said source means comprises a local disk drive.

7. The system of claim 1, wherein said buffer management means provides a frame from said local digital memory nearest to the frame requested by said control means.

8. The system of claim 1, wherein said prefetch means compares the buffer fill level to a request threshold and requests a select number of frames based on this comparison.

9. The system of claim 8, wherein said prefetch means requests no frames if the buffer fill level is greater than said request threshold, one frame if the buffer fill level is equal to or one frame less than the request threshold, and two frames if the buffer fill level is two frames or more less than the request threshold.

10. The system of claim 1, wherein said prefetch means makes fewer requests if the number of outstanding requests with said source means is greater than a threshold.

11. The system of claim 1, wherein said buffer management means further comprises:

infill means for infilling gaps in said subset.

12. A workstation for playing digital movie data under the control of a user, wherein the movie data comprises a plurality of tracks, the plurality of tracks including at least an audio track and a video track, wherein each of the tracks comprises a sequence of synchronized frames, and wherein at least one remote source means stores a portion of the movie data, the workstation comprising:

display means for displaying the movie data to said user;

control means, coupled to said display means, for providing the movie data to said display means under control of said user;

user interface means, coupled to said control means, for interacting with said user to provide said control of said user;

a plurality of buffer management means, one for each of said tracks, coupled to said control means and to the remote source means, for storing a subset of the movie data and providing the movie data as needed to said control means, said buffer management means comprising:

local digital memory that stores a plurality of frames including future frames and history frames, prefetch means for requesting future frames from the remote source means, and means for releasing a select frame from said storage means when a frame requested by said prefetch means becomes available; and cliplist management means, coupled to said control means and further coupled between said buffer management means and the remote source means, for tracking where said frames are stored within the remote source means and for routing requests for future frames from said prefetch means to the remote source means.

13. The workstation of claim 12, wherein said prefetch means comprises:

retrieval means for selectively requesting future frames;

decimation means for causing said retrieval means to request every dth future frame when the remote source means cannot provide movie data at the rate requested; and outstanding request means for causing said retrieval means to make fewer requests on the basis of the number of outstanding requests with the remote source means.

14. The workstation of claim 13, wherein said decimation means comprises:

designation means for designating certain of said tracks as priority tracks;

decimation counter means for incrementing a decimation counter d when the buffer fill-level drops below a low threshold and decrementing said decimation counter d when the buffer fill-level exceeds a high threshold;

global decimation counter means for incrementing a global decimation counter g each time a decimation counter d is incremented for one of said priority tracks, and decrementing said global decimation counter g each time a decimation counter d is decremented for one of said priority tracks; and means for causing said retrieval means to request every future frame for priority tracks, and every (d+g)th future frame for tracks not designated as priority tracks.

15. A method for playing digital movie data under the control of a user, wherein the movie data comprises a sequence of frames, and wherein at least one source stores a portion of the movie data, comprising the steps of:

(a) storing a plurality of frames including future frames and history frames in local storage, wherein said future frames and said history frames are a subset of the movie data, and wherein a buffer fill level indicates the degree to which said future frames and said history frames fill the local storage;

(b) tracking the location of the frames comprising the movie data within the one or more sources;

(c) requesting future frames from the one or more sources, wherein said step of requesting includes the steps of:
  (I) requesting a first number of future frames based on a comparison of said buffer fill level to a request threshold, and
  (ii) requesting every dth future frame when said source means cannot provide future frames at the rate at which they are requested, and wherein d is greater than one; and (d) displaying said locally stored frames under the control of the user.

16. The method of claim 15, wherein said first number is zero if said buffer fill level is greater than said request threshold, wherein said first number is one if said buffer fill level is equal to or one frame less than said request threshold, and wherein said first number is two if said buffer fill level is two frames or more less than said request threshold.

17. A system for playing digital movie data under the control of a user, wherein the movie data comprises a sequence of frames, said system comprising:

display means for displaying the movie data to said user;

control means, coupled to said display means, for providing the movie data to said display means under control of said user;

user interface means, coupled to said control means, for interacting with said user to provide control to said user;

at least one source means that stores a portion of the movie data; and buffer management means, coupled to said control means and to said source means, for storing a subset of the movie data and providing the movie data as needed to said control means, said buffer management means comprising:

local digital memory that stores a plurality of frames including future frames and history frames, wherein a buffer fill level indicates the degree to which said future frames and said history frames fill said local digital memory;

prefetch means for requesting every dth future frame from said source means, wherein said prefetch means increments d when said buffer fill-level drops below a low threshold and decrements d when said buffer fill-level exceeds a high threshold; and means for releasing a select frame from said local digital memory when a frame requested by said prefetch means becomes available.

18. A method for playing digital movie data under the control of a user, wherein the movie data comprises a sequence of frames, and wherein at least one source stores a portion of the movie data, comprising the steps of:

(a) storing a plurality of frames including future frames and history frames in local storage, wherein said future frames and said history frames are a subset of the movie data, and wherein a buffer fill level indicates the degree to which said future frames and said history frames fill the local storage;

(b) tracking the location of the frames comprising the movie data within the one or more sources;

(c) requesting future frames from the one or more sources, wherein said step of requesting includes the steps of:
  (I) requesting a first number of future frames based on a comparison of said buffer fill level to a request threshold, and
  (ii) requesting every dth future frame, wherein d is incremented when said buffer fill-level drops below a low threshold, and wherein d is decremented when said buffer fill-level exceeds a high threshold; and (d) displaying said locally stored frames under the control of the user.

\* \* \* \* \*